US011165270B2

(12) United States Patent
Owen et al.

(10) Patent No.: US 11,165,270 B2
(45) Date of Patent: Nov. 2, 2021

(54) PREDICTIVE MANAGEMENT OF BATTERY OPERATION

(71) Applicant: Microsoft Technology Licensing, LLC, Redmond, WA (US)

(72) Inventors: Craig Daniel Owen, Kirkland, WA (US); Dongli Zeng, Redmond, WA (US); Jeffrey Duane Bruce, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 16/417,330

(22) Filed: May 20, 2019

(65) Prior Publication Data
US 2020/0303938 A1 Sep. 24, 2020

Related U.S. Application Data

(60) Provisional application No. 62/821,943, filed on Mar. 21, 2019.

(51) Int. Cl.
*H02J 7/00* (2006.01)
*H01M 10/42* (2006.01)
(Continued)

(52) U.S. Cl.
CPC ......... *H02J 7/0071* (2020.01); *H01M 10/425* (2013.01); *H01M 10/44* (2013.01); *H01M 10/48* (2013.01); *H01M 2010/4271* (2013.01)

(58) Field of Classification Search
USPC ........................................................ 320/137
See application file for complete search history.

(56) References Cited

U.S. PATENT DOCUMENTS 9,653,759 B2   5/2017 Coates
2011/0057603 A1   3/2011 Marty et al.
(Continued)

FOREIGN PATENT DOCUMENTS

CN   108804764 A   11/2018
EP   2505418 A2   10/2012
(Continued)

OTHER PUBLICATIONS

Theocharous, et al., "Machine Learning for Adaptive Power Management", In Journal of Autonomic Computing, vol. 10, Issue 4, Nov. 9, 2006, pp. 299-312.
(Continued)

*Primary Examiner* — Bryce M Aisaka
(74) *Attorney, Agent, or Firm* — Alleman Hall Creasman & Tuttle LLP

(57) ABSTRACT

An electronic device includes a battery and a battery management system. The battery management system is configured to derive a predicted battery demand based on observed usage patterns to predictively charge the battery to healthily accommodate the predicted battery demand. The battery management system is further configured to determine a predicted deviating battery demand based on a contextual signal. The predicted deviating battery demand differing from the predicted battery demand. The battery management system is further configured to predictively charge the battery to healthily accommodate the predicted deviating battery demand.

20 Claims, 5 Drawing Sheets

(51) Int. Cl.
*H01M 10/44* (2006.01)
*H01M 10/48* (2006.01)

(56) References Cited

U.S. PATENT DOCUMENTS

| | | |
|---|---|---|
| 2013/0091083 A1 | 4/2013 | Frisch et al. |
| 2013/0204442 A1* | 8/2013 | Modi ............... G05B 15/02 |
| | | 700/278 |
| 2015/0351037 A1 | 12/2015 | Brown et al. |
| 2017/0005470 A1* | 1/2017 | Wagoner ............... H02J 3/32 |
| 2017/0346303 A1 | 11/2017 | Vanblon et al. |
| 2019/0011970 A1 | 1/2019 | Youn et al. |

FOREIGN PATENT DOCUMENTS

| | | |
|---|---|---|
| WO | 2015063340 A1 | 5/2015 |
| WO | 2017206107 A1 | 12/2017 |

OTHER PUBLICATIONS

"International Search Report and Written Opinion Issued in PCT Application No. PCT/US20/022506", dated Jun. 15, 2020, 09 Pages.

* cited by examiner

PREDICTIVE MANAGEMENT OF BATTERY OPERATION

CROSS REFERENCE TO RELATED APPLICATIONS

This application claims priority to U.S. Provisional Patent Application Ser. No. 62/821,943, filed Mar. 21, 2019, the entirety of which is hereby incorporated herein by reference for all purposes.

BACKGROUND

Current consumer electronics' batteries degrade faster when in a fully charged state. Due to demand for higher energy density, chemistries used in batteries for consumer electronic devices may be pushed to higher and higher voltages. More time spent at full (or near full) charge can result in more damage being inflicted on the battery. As one example, a battery that is kept at full charge too long may expand from gas generation and cause a battery package to expand within the device housing, which could de-laminate screens, keyboards, etc. from internal pressure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An electronic device includes a battery and a battery management system. The battery management system is configured to determine a predicted battery demand based on observed usage patterns and predictively charge the battery to healthily accommodate the predicted battery demand. The battery management system is further configured to determine a predicted deviating battery demand based on a contextual signal. The predicted deviating battery demand differing from the predicted battery demand. The battery management system is further configured to predictively charge the battery to healthily accommodate the predicted deviating battery demand.

DETAILED DESCRIPTION

While battery health issues have always existed, only recently has battery chemistry been pushed to the limits where consumers are more often experiencing increasingly more severe lowered battery health effects. In order to address these issues, a conventional Battery Management System (BMS) may be used to monitor and control operation of a battery to protect the battery's health. As one example, the BMS may dynamically control a speed at which a battery is charged. As another example, the BMS may control where full charge and full discharge levels are set for the battery. The BMS may be implemented at the integrated circuit (IC) level as a custom silicon logic chip. In this IC-based implementation, the BMS may have minimal interaction with a device and/or product that is being powered by the battery. For example, only a few parameters such as battery charge percentage, state of health, and charge time may be passed from the BMS to the device. Likewise, the BMS may receive minimal or no information relating to the device being powered by the battery. Additionally, the BMS may receive little or no information about the user that controls the device, because the BMS is buried deep within the device hardware and has little or no interaction with, and/or awareness of, the user.

As such, the BMS is unable to respond to situations where the BMS may be overestimating or underestimating the damage that is being inflicted on the battery by the device and/or the user. Designing a BMS to include such capabilities may increase the packaging size and power consumption of the integrated circuit. Most conventional BMS chips are not designed for use with specific devices and are not capable of being tuned to a particular device or use-case scenario.

Accordingly, this disclosure is directed to an improved BMS in which battery management is handled through the system and/or software on the device, optionally using machine learning (ML) and artificial intelligence (AI) to learn and predict user behavior for the device to increase BMS performance. The BMS described herein is a system-smart, product-integrated, and user adaptable BMS, with significantly higher user context awareness that improves battery health and lifetime. In particular, such a BMS may be configured to derive a predicted battery demand based on observed user-specific usage patterns and to predictively charge the battery based on the predicted battery demand. By using pattern recognition, machine learning, integration with scheduling applications running on the device (e.g., email, calendar, notes, maps), and other smart signals (e.g., software, hardware), the BMS is able to adapt to the user's behavior, modulating the battery charge up and down in a smart, user- and device-specific way to improve battery health and decrease degradation.

Figure 1:
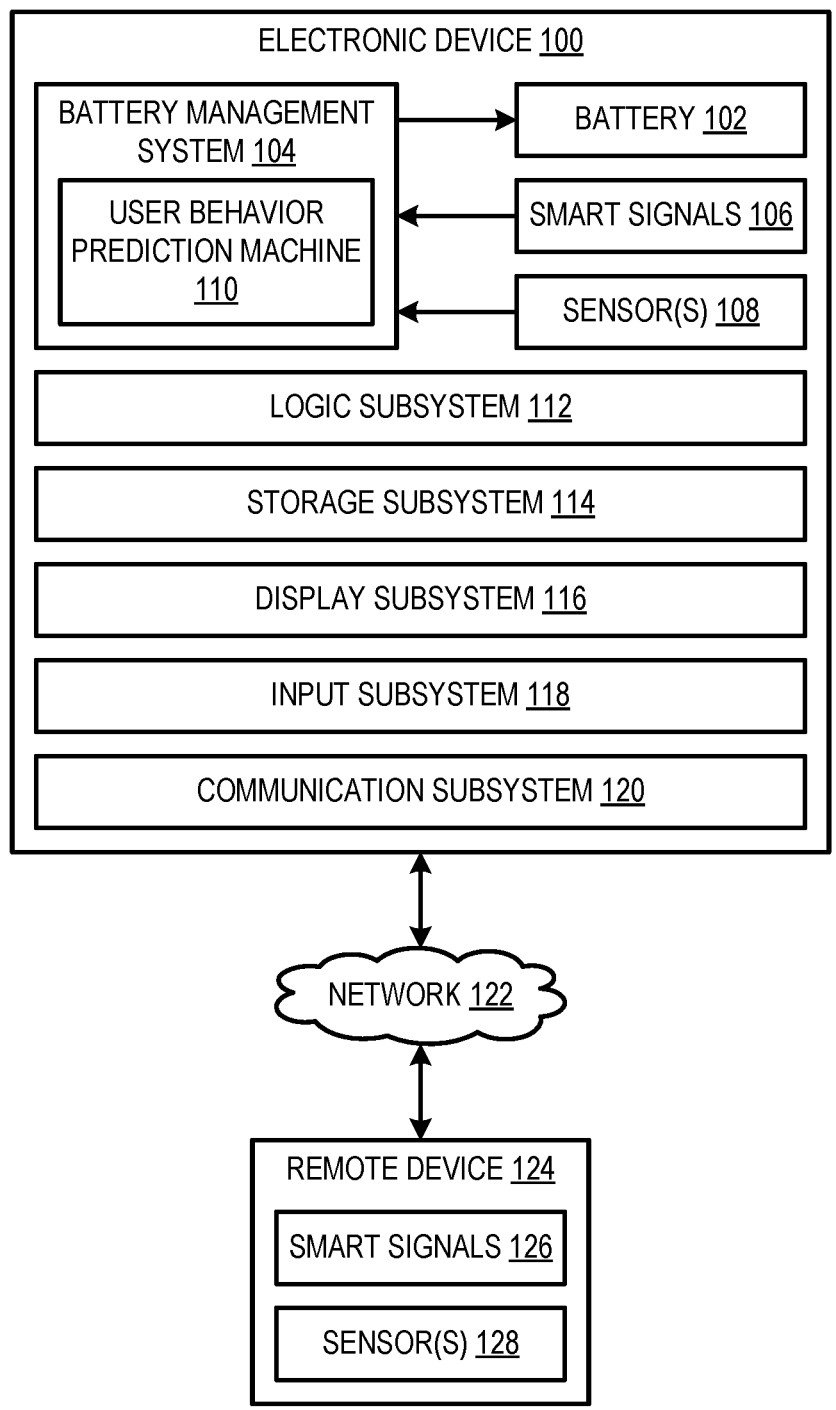
FIG. 1 schematically shows an example battery management system for a battery powered electronic device.

FIG. 1 schematically shows an example electronic device 100 that may be powered by a battery 102. The electronic device 100 may include any suitable battery-powered electronic device. For example, the electronic device 100 may be a smartphone, laptop computer, tablet computer, game console, smartwatch, health monitoring device, display device, virtual reality (VR) or augmented reality (AR) device, or an intelligent assistant speaker device. The battery 102 may include any suitable power technology. For example, the battery 102 may be a lithium-ion battery, nickel-cadmium battery, nickel metal hydride battery, or lead-acid battery.

The electronic device 100 includes a BMS 104 configured to monitor and predictively control operation of the battery 102 based on user behavior. The BMS 104 may be configured to collect context information from a plurality of smart signals 106—e.g., information from different application programs executed by the electronic device, an operating system of the electronic device, and/or external signals from other devices. The context information may be used to characterize user behavior for the electronic device 100 including normal charge/discharge patterns of the battery 102 within the electronic device and the use case/operating conditions for the electronic device 100. The context information may characterize the user behavior for the electronic device 100 in any suitable manner. For example, the context information may provide answers to context questions, such as does the user always charge their device at night? If so, at what time? Is the device always plugged in at work? What are the times of the day in which the user hardly uses or does not use the electronic device? What are the times of the day that the user heavily uses the device? The context information may be used to determine previously observed user behavior for operating the electronic device 100. The previously observed user behavior may indicate a previous pattern of use for the electronic device 100. Furthermore, the context information may be used to determine predicted deviating user behavior for operating the electronic device 100. The predicted deviating user behavior may indicate future usage of the electronic device 100 that deviates from the previous pattern of use indicated by the previously observed user behavior.

The BMS 104 may collect context information from any suitable smart signals 106 of the electronic device 100. Smart signals 106 may originate from different sources within the computing architecture of the electronic device 100. Non-limiting examples of different sources of context information include a search engine, calendar application, scheduling application, email application, map application, note-taking application, health and/or exercise monitoring application, travel application, weather application, and virtual personal assistant application.

In some implementations, the battery monitoring system 104 may be configured to collect context information in the form of different parameters from one or more sensors 108 of the electronic device 100. A parameter may include any suitable physical parameter that characterizes power, motion, position, location, and/or other information related to the electronic device 100. The sensor(s) 108 may include any suitable type of sensor. Non-limiting examples of sensors include, but are not limited to electrical sensors for measuring the charge or discharge current flowing through the battery, the voltage across the battery terminals, the state of charge of the battery, as well as the temperature of the battery, an inertial measurement unit (IMU) configured to provide position and/or orientation information of the electronic device 100; a global positioning system (GPS) sensor configured to provide a geographical location of the electronic device 100 via communication with a GPS satellite network; a personal activity tracker configured to track different physical parameters of a user of the electronic device 100 (e.g., count a number of steps, count a number calories burned); one or more barometers; temperature sensors; visible-light sensors, ultraviolet sensors, ambient temperature sensors, physical contact sensors, and a clock/timer to trigger various temporal events. Further, various additional parameters may be derived from such sensors, such as speed, acceleration, height, and other suitable parameters. Such sensors may be in communication with one or more circuits or other machines of the electronic device configured to translate measurements of the physical parameters into machine-readable sensor data.

In some implementations, the electronic device 100 may be configured to communicate with one or more remote electronic devices. For example, the electronic device 100 may be communicatively coupled to a remote device 124 via a computer network 122, such as the Internet. The electronic device 100 may be configured to communicate with any suitable type and/or number of different remote devices to receive context information. Such remote devices may include user devices, such as a user's smart watch, smart phone, or a smart assistant device. As another example, such remote devices may include cloud services that collect information from various sources. As yet another example, such remote devices may include remote sensor devices, such as a GPS system or a cellular communication tower configured to communicate with the electronic device 100 to determine a position of the electronic device 100 (e.g., via signal localization).

The remote device 124 may be configured to collect context information from a plurality of smart signals 126—e.g., information from different application programs executed by the remote device 124, an operating system of the remote device 124, and/or external signals from other remote devices. Further, the remote device 124 may be configured to collect context information in the form of different parameters from one or more sensors 128 of the remote device 124. The remote device 124 may be configured to provide any suitable context information to the electronic device 100. The electronic device 100 may use context information received from the remote device 100 to determine either previously observed user behavior or predicted deviating user behavior for controlling operation of the battery 102.

In some implementations, the electronic device 100 and/or the remote device 124 may include natural language processing componentry, such as a microphone for speech and/or voice recognition. The electronic device 100 and/or the remote device 124 may be configured to extract contextual signals from the recognized speech that may be used to inform predictions of user behavior (and/or deviations in user behavior). In some examples, the electronic device 100 and/or the remote device 124 may include a virtual assistant application (e.g., Cortana, Siri, Alexa) configured to recognize contextual signals. Non-limiting examples of contextual signals recognizable by the virtual assistant application include scheduled meetings/appointments/social gatherings, travel itineraries, and other events (either repeatedly occurring or one-time events).

In some implementations, the electronic device 100 may support an opt-in/out application or process. The opt-in/out application or process may enable a user to specify whether or not the electronic device 100 collects context information in order to predictively control operation of the battery 102 based on the user's behavior.

The collected context information may be provided as input to a user behavior prediction machine 110. The user behavior prediction machine 110 may be configured to perform pattern recognition (e.g., Artificial Intelligence and/or Machine Learning) processes using the context information to recognize previously observed user behavior for the electronic device and predict how the user will use the electronic device 100 (e.g., over the next minute, hour, and/or day) in the form of a predicted battery demand that is based on the previously observed user behavior. Furthermore, the user behavior prediction machine may be configured to recognize predicted deviating user behavior that deviates from the previously observed user behavior based on one or more context signals and determine a predicted deviating battery demand based on the one or more context signals.

User behavior (previously observed user behavior and/or predicted deviating user behavior) and/or adaptive power/battery control may be modeled in any suitable manner, for example using any suitable combination of state-of-the-art and/or future machine learning (ML), artificial intelligence (AI), and/or natural language processing (NLP) techniques. In some examples, user behavior may be modeled by one or more machine learning classifiers, trained to predict a user action for a usage context (e.g., for exemplary input data drawn from scheduling applications, current battery power level, previous actions taken by the user, previous power control actions taken by the system, etc.). For example, machine learning classifiers may be trained to predict the user actions based on a plurality of labelled example user actions, each labelled example user action including an exemplary usage context and a user action that was performed by a user in that context. In some examples, machine learning classifiers may be alternately or additionally trained to predict power control actions (adjusting state of charge limits), e.g., based on a plurality of labelled example system actions, each labelled example system action including a usage context and a power control action that should be taken in that context (e.g., as indicated by historical data, ground truth labels supplied by human trainers, etc.). In some examples, user behavior may be modeled by one or more machine learning models configured to generate, for a usage context and/or for a sequence of usage contexts, a sequence of user actions and/or power control actions. In some examples, user behavior may be modeled by a machine learning model trained using reinforcement learning. For example, the reinforcement learning model may include a decision function configured to select power control actions (adjusting state of charge limits) with regard to usage contexts (e.g., based on context information from smart signals and sensors of the electronic device and/or other remote devices), and trained with regard to reinforcement signals including power events (e.g., rate of battery drain, plugged into/unplugged from a power source), with regard to user feedback (e.g., regarding user satisfaction while using the BMS 104), etc. For example, generating the sequence of user actions and/or power control actions may be based on operating machine learning classifier models, reinforcement learning models, and the like.

Non-limiting examples of techniques that may be used to predict user behavior, and/or to adaptively select power control actions based on user behavior include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models). For example, temporal convolutional neural networks and/or recurrent neural networks may be trained to predict user actions and/or power control actions based on a sequence of usage contexts.

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

By using pattern recognition, machine learning, integration with scheduling and other smart signals of the electronic device, and parameters from sensors of the electronic device (and/or other remote devices), the user behavior prediction machine 110 may be able to adapt to the user's behavior, and control the battery 102 (e.g., modulating the battery charge up and down) in a smart and user-specific way to increase battery health and decrease degradation. For example, the BMS 104 may adjust a state of charge limit to any suitable limit, such as 100%, 90%, 80%, 70%, 60%, 50%, 40%, or another lower limit where battery degradation is considerably lower than in its fully charged state. The BMS 104 may be configured to determine a predicted battery demand based on observed user-specific usage patterns, and predictively charge the battery 102 to healthily accommodate the predicted battery demand. In some examples, the BMS 104 may be configured to healthily charge the battery 102 to accommodate the predicted battery demand by purposefully undercharging the battery 102 or limiting the state of charge to less than a full state of charge (90%, 80%, 70%, 60%, 50%, etc.) based on a prediction that the full state of charge will not be needed and/or the electronic device is likely to remain connected to a power source. In other examples, the BMS 104 may be configured to predictively charge the battery 102 to healthily accommodate the predicted battery by increasing a state of charge from a less-than-full state of charge to a full state of charge responsive to predicting the electronic device is likely to be disconnected from a power source.

The BMS 104 may be further configured to determine a predicted deviating battery demand based on a contextual signal that indicates a deviation from a previously observed usage pattern of the electronic device such that the predicted deviating battery demand differs from the predicted battery demand. The BMS 104 may be configured to predictively charge the battery 102 to healthily accommodate the predicted deviating battery demand. In some examples, the BMS 104 may be configured to healthily charge the battery 102 to accommodate the predicted deviating battery demand by purposefully undercharging the battery 102 or limiting the state of charge to less than a full state of charge based on a prediction that the full state of charge will not be needed and/or the electronic device is likely to remain connected to a power source. In other examples, the BMS 104 may be configured to predictively charge the battery 102 to healthily accommodate the predicted deviating battery by increasing a state of charge from a less-than-full state of charge to a full state of charge responsive to predicting the electronic device is likely to be disconnected from a power source.

In some implementations, the BMS 104 may be configured to predictively adjust the state of charge of the battery 102 based on a confidence level of the predicted battery demand/predicted deviating battery demand. The level of confidence may be determined in any suitable manner. As one example, the confidence level may be adjusted based at least in part on temporal considerations. In one example, the confidence level may increase over time as long as a usage pattern for the electronic device remains consistent. For example, a high confidence level may be determined based on a consistent history of use over the course of weeks, months, or years. Moreover, the BMS may repeatedly assess the confidence level over time and adjust the stage of charge of the battery based on the updated confidence level. As another example, the confidence level may be adjusted based at least in part on one or more other signals. For example, different contextual signals (e.g., travel itinerary, meeting schedule, GPS signal, user utterances heard and interpreted using natural language processing) may indicate that a user is traveling without the electronic device (e.g., because the device is not being used and/or has a different GPS location). The BMS 104 may be configured to determine a confidence level based on the number of contextual signals that indicate that the electronic device is not with the user. In this case, the BMS 104 may lower the state of charge (e.g., to 60%) of the battery for the duration of the user's travels, since the BMS has a high confidence that the electronic device will not be used while the user is traveling due to the multiple contextual signals indicating that the electronic device is not with the user while the user is traveling.

In some such implementations, the BMS 104 may be configured to set the state of charge of the battery 102 to a charge level that is inversely proportional to a confidence level determined by the BMS. In one example, the BMS 104 may be configured to predictively charge the battery 102 to a 50% state of charge if the BMS is 99% certain the battery will not be needed; 60% state of charge if the BMS is 90% certain the battery will not be needed; 70% state of charge if the BMS is 80% certain the battery will not be needed; 80% state of charge if the BMS is 70% certain the battery will not be needed; 90% state of charge if the BMS is 60% certain the battery will not be needed; and 100% state of charge if the BMS is 50% certain the battery will not be needed. Note that these relationships between charge and certainty or confidence level are provided as an example. The BMS 104 may be configured to adjust the state of charge of the battery 104 in any suitable manner in relation to any suitable confidence level.

The electronic device 100 includes a logic subsystem 112 and a storage subsystem 114. The electronic device 100 may optionally include a display subsystem 116, input subsystem 118, communication subsystem 120, and/or other subsystems not shown in FIG. 1.

Logic subsystem 112 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 114 includes one or more physical devices configured to temporarily and/or permanently hold computer information such as data and instructions executable by the logic subsystem. When the storage subsystem includes two or more devices, the devices may be collocated and/or remotely located. Storage subsystem 114 may include volatile, nonvolatile, dynamic, static, read/write, read-only, random-access, sequential-access, location-addressable, file-addressable, and/or content-addressable devices. Storage subsystem 114 may include removable and/or built-in devices. When the logic subsystem 112 executes instructions, the state of storage subsystem 114 may be transformed—e.g., to hold different data.

Aspects of logic subsystem 112 and storage subsystem 114 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 116 may be used to present a visual representation of data held by storage subsystem 114. This visual representation may take the form of a graphical user interface (GUI). Display subsystem 116 may include one or more display devices utilizing virtually any type of technology. In some implementations, display subsystem may include one or more virtual-, augmented-, or mixed reality displays.

When included, input subsystem 118 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 120 may be configured to communicatively couple the electronic device 100 with one or more other computing devices. Communication subsystem 120 may include wired and/or wireless communication devices compatible with one or more different communication protocols. The communication subsystem may be configured for communication via personal-, local- and/or wide-area networks.

Figure 2:
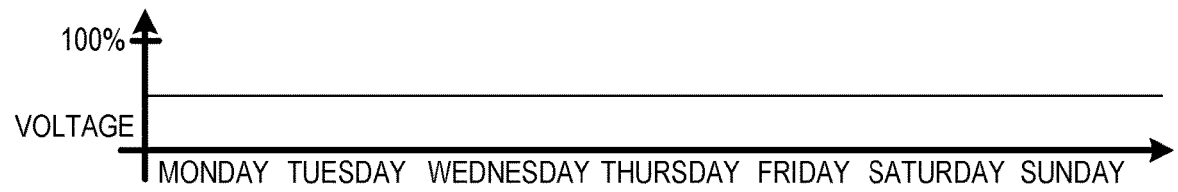
FIGS. 2-4 show different examples of predictively charging a battery of an electronic device to healthily accommodate a predicted battery demand based on different previously observed usage behavior for the electronic device.
Figure 3:
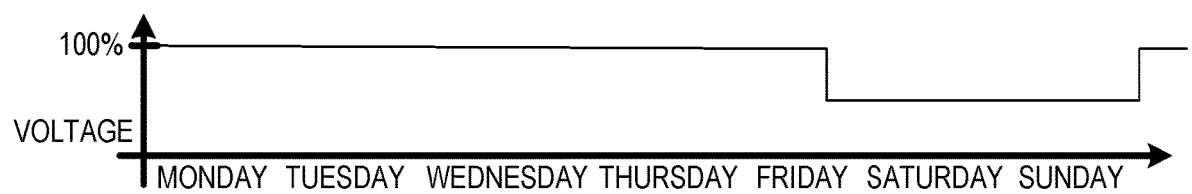
Figure 4:
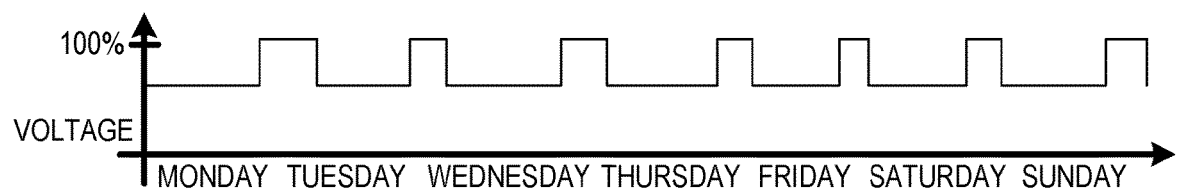

The BMS 104 may control the battery 102 in any suitable manner based on predictions of the user's behavior determined by the user behavior prediction machine 110. FIGS. 2-4 show different examples where a battery of an electronic device is predictively charged to healthily accommodate a predicted battery demand based on different previously observed usage behavior for the electronic device.

FIG. 2 shows an example scenario where an electronic device has previously been consistently plugged into a power source. The BMS 104 may be configured to recognize this usage pattern based on previously observed context information and set the battery state of charge limit to 60% while the electronic device is plugged in to the power source so as to do the least amount of long-term harm to the battery. If the electronic device were to be unplugged from the power source, then the battery would not have a full state of charge. However, the previously observed user behavior learned by the BMS 104 indicates that such a scenario may have a low likelihood of occurring.

Based on current battery chemistry, battery degradation reduces significantly when state of charge drops to 80% and below, although degradation can be further reduced at even lower states of charge. Accordingly, it is desirable to decrease the state of charge as much as possible. However, low states of charge may provide an unfavorable user experience if the user unexpectedly unplugs, because the user will have less battery capacity available for unplugged usage. As such, the state of charge may be dynamically set based on a relative confidence that the device will remain plugged in. When the BMS 104 confidently predicts plugged in operation, the state of charge may be dropped to relatively lower levels than when the BMS 104 less confidently predicts plugged in operation. As such, the BMS 104 is able to balance between battery protection and user experience. Note that the BMS 104 may be configured to determine a predicted battery demand for the battery based on any suitable degree of observed user-specific usage patterns having any suitable confidence level.

FIG. 3 shows an example scenario where an electronic device has previously been observed to be consistently plugged in to a power source during weekends but has been observed to be inconsistently plugged in during the week. For example, this usage scenario may be for a student that leaves their laptop at school during the week and then takes it at home over the weekend. In this scenario, the BMS 104 may be configured to recognize this usage pattern based on previously observed context information and increase the battery state of charge limit to 100% during the school week to allow for the battery to be fully charged in preparation for the device being used without being plugged in to a power source. Further, the BMS 104 decreases the battery state of charge limit to 60% during the weekend when it is anticipated that the device is going to be plugged into a power source for an extended period of time as learned from the previously observed usage behavior. In anticipation of the device transitioning back to inconsistent plug ins, the BMS 104 may be configured to fully charge the device early Monday morning before the user typically unplugs and takes the device back to school.

FIG. 4 shows an example scenario where an electronic device has previously been observed to be consistently plugged into a power source during work hours and then unplugged from the power source at the end of the workday. The BMS 104 may be configured to recognize this pattern based on previously observed context information and set the battery state of charge limit to 60% while the electronic device is expected to remain plugged in during the work hours so as to do the least amount of long-term harm to the battery. Further, the BMS 104 may be configured to increase the battery state of charge limit to 100% prior to the end of the user's work day to allow the electronic device to have a fully charged battery for the predicted period where the electronic device will not be plugged into the power source (e.g., when the user leaves work). In this scenario, the BMS 104 predicts that if the user will not be using the battery for a defined period, the device commands the battery to lower its full charge state down to reduce battery degradation. If the device predicts a scenario of usage (in particular unplugged usage), the device will allow the battery to charge up to its maximum to provide the user increased unplugged runtime.

Figure 5:
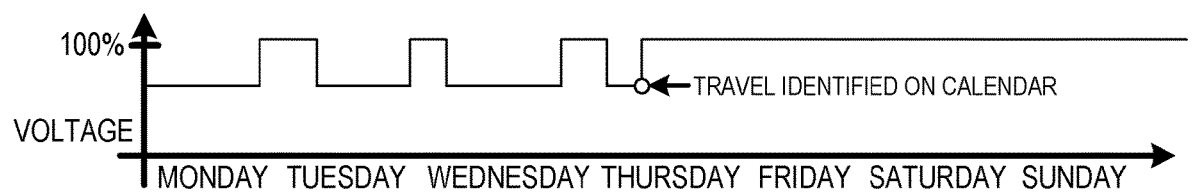
FIG. 5 shows an example of predictively charging a battery of an electronic device to healthily accommodate a predicted deviating battery demand based on deviating usage behavior that differs from previously observed usage behavior for the electronic device.

Furthermore, the BMS 104 may be configured to predict when a user will deviate from a learned pattern of usage behavior based on deviating behavior context information that indicates such a deviation. FIG. 5 shows an example scenario where an electronic device is plugged into a power source during workdays similar to the usage pattern shown in FIG. 4. However, a calendar application on the electronic device indicates that the user is going to be traveling and has to take a flight midday on Thursday. The BMS 104 may adjust the charging schedule of the electronic device based on this deviating behavior context information to predictively charge the battery differently to ensure that the battery is 100% charged by the time the user has to leave work for the flight. The BMS 104 may further deviate from the daily charging schedule while the user is traveling (as indicated by the dates on the calendar) to keep the state of charge limit increased to 100%. Furthermore, when the user returns from the trip, the BMS 104 may be configured to return to the normal charging schedule in accordance with the previously observed user behavior if no other schedule deviations are found on the calendar. In this example, the upcoming flight on the user's calendar may be a good predictor that the user is likely to unplug and take their device with them (and expect a full battery for the flight). As such, the BMS 104 may dynamically and predictively adjust the operation of the battery to meet the anticipated needs of the user. In some implementations, the BMS 104 may be configured to validate the return to the normal charging schedule/usage behavior pattern by checking available contextual signals for confirmation. For example, the BMS 104 may check whether the GPS signal indicating the current location of the device matches the location of the user's home/work to confirm that the user's trip has concluded. Further, this check can be cross-checked with other contextual signals, such as checking for no additional scheduled meetings in other cities or travel itineraries to other cities.

In addition to the calendar application, the BMS 104 may use other smart signals (software, sensors) to predict user behavior. Such smart signals may originate from sensors on the device with the battery, an operating system or other applications on the device with the battery, sensors on remote devices, applications on remote devices, cloud services, and/or virtually any other source. In some embodiments, the BMS 104 may utilize an Application Programing Interface (API) that allows various sources to communicate different smart signals and/or parameters to the BMS 104. The BMS 104 may be trained to factor such smart signals into predictive models, e.g., via machine learning, fuzzy logic, or heuristics.

The following are nonlimiting examples of how the BMS 104 can be trained to deviate from predictive models based only on observed past behavior responsive to smart signals to predictively charge the battery to healthily accommodate a predicted deviating battery demand. In one example, a device with a smart assistant (e.g., Cortana, Siri, Alexa) may hear that a user is going to a meeting, and the BMS 104 may adjust charging of the battery to be fully charged for the meeting. Similar actions may be taken by the BMS 104 based on a meeting or other deviation being identified in a text message or email. In another example, a health application may recognize when a user wakes up each morning, and the BMS 104 may adjust a charging state of the battery to fully charge responsive to the user waking up. If the user's calendar indicates that the user is taking an early flight one morning, then the BMS 104 may deviate from the previously observed behavior and fully charge the battery earlier than usual so that the user's device is ready for the flight. In another example, a mobile phone with a GPS may communicate to a service that a user is heading home to a plugged-in device that often gets unplugged when the user gets home, and the service may remotely cooperate with the BMS 104 to fully charge the device just prior to the user's predicted arrival so that it is ready when the user arrives home. In another example, the same mobile phone may report that a user is on vacation in Hawaii and definitely will not be needing to unplug a device that is on the user's desk back home until the user returns from Hawaii. In this scenario, the BMS 104 recognizes that the user does not have the device and thus the future usage behavior will deviate from the previously observed usage behavior until the user returns from the trip. Signals like this may be used to deviate charge patterns from your normal predicted behavior.

Additional scenarios of high-temperature or high-power draw are also considered by the BMS 104. For example, if ambient temperatures are identified as being higher than a threshold, then the BMS 104 may decrease the state of charge limit of the battery as elevated temperatures can decrease the health of the battery and vice versa.

Figure 6:
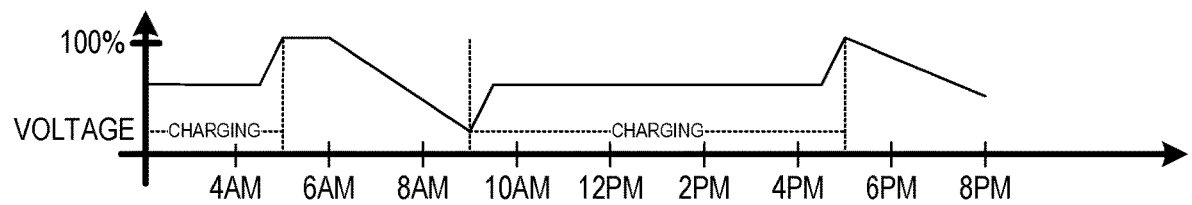
FIG. 6 shows another example of predictively charging a battery of an electronic device to healthily accommodate a predicted battery demand based on previously observed usage behavior for the electronic device.

FIG. 6 shows an example scenario of a learned usage pattern for an electronic device over the course of a day. The learned usage pattern may be determined based on one or more different contextual signals. Early in the morning (e.g., when the user is sleeping), the electronic device has previously been observed to be consistently plugged into a power source. As such, the BMS 104 may be configured to lower the state of charge (e.g., 60%) of the battery 102 to healthily accommodate the predicted battery demand. Further, at a time prior to when it has been previously observed that the user wakes up (e.g., 5 AM), the BMS 104 increases the state of charge of the battery 102 to a full state of charge in anticipation of the electronic device being unplugged from the power source and used while the user is going to work. For example, the BMS 104 may learn the user's typical wakeup time based on contextual signals received from a smartwatch worn by the user and/or other contextual signals that indicate when the user typically starts using the electronic device each day. At 9 AM, the user arrives at work and plugs in the electronic device to a power source. The user typically leaves the electronic device plugged into the power source during work hours and then unplugs the electronic device from the power source at the end of the workday. The BMS 104 may be configured to recognize this pattern based on previously observed context information and set the battery state of charge limit to 60% while the electronic device is plugged in during the work hours so as to do the least amount of long-term harm to the battery. At a time prior to when it has been previously observed that the user leaves work (e.g., 5 PM), the BMS 104 increases the state of charge of the battery 102 to a full state of charge in anticipation of the electronic device being unplugged from the power source and used while the user is going home from work.

Figure 7:
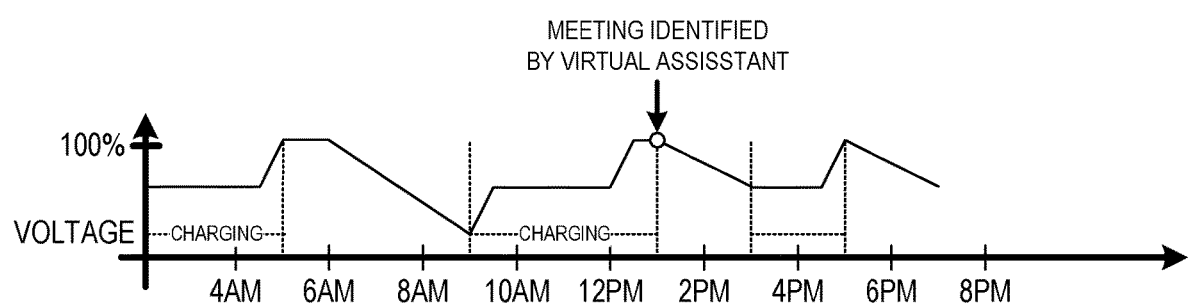
FIG. 7 shows another example of predictively charging a battery of an electronic device to healthily accommodate a predicted deviating battery demand based on deviating usage behavior that differs from previously observed usage behavior for the electronic device.

FIG. 7 shows an example scenario where an electronic device has a usage pattern similar to the usage pattern shown in FIG. 6. However, a virtual assistant on the electronic device indicates that the user has a meeting from 1 PM to 3 PM. The BMS 104 is configured to predicatively charge the battery 102 according to the predicted battery demand based on the previously observed usage patterns for the electronic device until a time prior to the scheduled meeting (e.g., 12 PM). At this time, the BMS 104 predictively charges the battery to healthily accommodate a predicted deviating battery demand that differs from the previously observed battery demand that would typically occur at this time. The BMS 104 determines the deviation from the previously observed usage patterns based on a contextual signal in the form of the scheduled meeting identified by the virtual assistant application executed on the electronic device. The BMS 104 increases the state of charge of the battery 102 to a full state of charge prior to the meeting in anticipation of the electronic device being unplugged from the power source and used while the user is attending the meeting. When the meeting is over at 3 PM and the electronic device is plugged back into the power source, the BMS 104 returns to returning to predictively charging the battery according to the predicted battery demand by setting the battery state of charge limit to 60% while the electronic device is plugged in during the work hours. At a time prior to when it has been previously observed that the user leaves work (e.g., 5 PM), the BMS 104 increases the state of charge of the battery 102 to a full state of charge in anticipation of the electronic device being unplugged from the power source and used while the user is going home from work. In the above described scenarios, the BMS 104 uses contextual signals to determine both a predicted battery demand and a predicted deviating battery demand to predictively charge the battery in a healthy manner.

In some examples, the BMS 104 may be configured to vary the state of charge of the battery over time based on the BMS 104 being highly confident that a charging event will occur (or will not occur). For example, the BMS 104 may be highly confident that the electronic device will be plugged into a power source at the end of the day. In the morning, when the electronic device is plugged into a power source at work, the BMS 104 may set the state of charge to be higher (e.g., 80%), so that if the electronic device becomes unplugged from the power source, the battery is likely to have enough charge to power the electronic device until the electronic device is plugged into the power source at the end of the day. Further, in the afternoon, when the electronic device is plugged into a power source at work, the BMS 104 may set the state of charge to be lower (e.g., 40%), so that if the electronic device becomes unplugged from the power source, the battery is still likely to have enough charge to power the electronic device until the electronic device is plugged into the power source at the end of the day.

This smart BMS 104 is able to constantly evolve and re-train to adapt to how the user changes their device use pattern over time. For example, if a user starts taking their device on more trips or starts attending school/classes where they needed more battery power (no power cord connection), the application/process identifies a behavior shift and re-learns the new usage scenario to adapt to this new use case.

By identifying events on a scheduling program/application, the system-smart BMS 104 can charge the battery to full in preparation of a meeting/travel/etc. where the user does not have access to a power cable to be plugged in, even when such meeting/travel/etc. deviates from the user's already-learned patterns. This scheduling integration can feed context information to the pattern recognition (PR) system to improve its predictions or can override the predicted use-case of the PR system in the event that a valid full-charge scenario/event occurs which deviates from normal patterns.

Adding these additional smart, and user-facing context tools allows the existing BMS 104 to transform into a new system-smart, user adaptable BMS 104. This new system-smart BMS 104 adapts to every specific user, morphing to their specific use case and patterns to get the most out of their battery performance and lifetime instead of the current "one-size fits all" approach. This new approach provides a seamless adaptation of the battery usage to the user, requiring no action from the user to change how they use their device/battery to improve the battery lifetime and health.

In some implementations, the BMS 104 may be configured to maintain a user profile of predicted user behavior patterns across a plurality of electronic devices associated with a particular user. The user's interactions with each of the devices may be collected as context information in the user profile. The user profile may inform predictions of user behavior by BMSs of each of the plurality of electronic devices associated with the user. Moreover, if the user buys a new electronic device, the BMS on that electronic device can access the user profile to be immediately informed of previous usage behavior patterns of the user that may inform future predictions made by the BMS on the new electronic device. In some example, profile information may be saved on a network-accessible computer, for example as a cloud-computing profile.

The most advanced existing BMSs may use some timer-based event counting. For example, an internal timer may be used to identify how long a device is plugged in, and if it is plugged in for at least a defined period, the BMS may lower the charging voltage to prevent damage. However, these simple timer-based designs are reactionary vs. proactive. Without employing the deep pattern recognition and integration with scheduling programs/applications, the timer-based designs cannot predict future usage and adjust the battery to best accommodate a predicted future usage. Being reactionary with low integration to the system/product means that these systems are still applying a "one-size fits all" approach. Because the timer-based designs are non-predictive, a user could experience a lower charged battery when disconnecting power because the BMS is not smart enough to identify that the user needed the full battery power at that time. This would cause the user to experience a lower battery runtime which results in a degraded user experience. Because they are not adaptable, they cannot change when user behavior changes. Because existing BMS are not designed to consider rich contextual information about the user, existing BMS can over and under-correct for battery usage.

Figure 8:
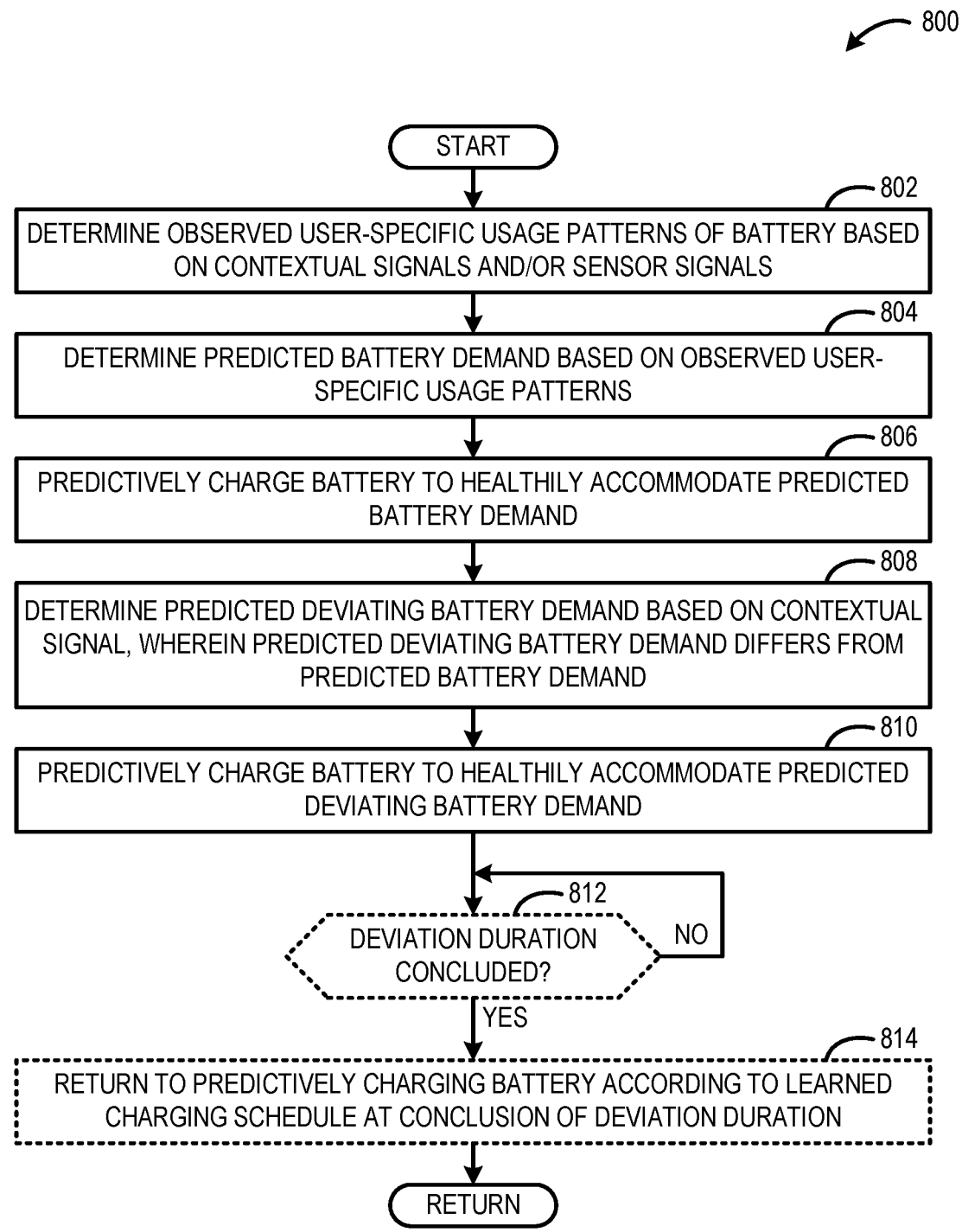
FIG. 8 shows a flowchart of an example method for charging a battery of an electronic device.

FIG. 8 shows an example method 800 for charging a battery of an electronic device. For example, the method 800 may be performed by the BMS 104 shown in FIG. 1. At 802, the method 800 includes determining observed user-specific usage patterns of a battery of an electronic device based on contextual signals and/or sensor signals. Such signals may be received from software applications and/or sensors of the electronic device and/or a remote device in communication with the electronic device. At 804, the method 800 includes determining a predicted battery demand based on the observed user-specific usage patterns. At 806, the method 800 includes predictively charging the battery to healthily accommodate the predicted battery demand. In some examples, predictively charging the battery to healthily accommodate the predicted battery demand may include limiting the state of charge to a less-than-full state of charge responsive to the predicted battery demand predicting the electronic device is likely to remain connected to a power source. For example, the state of charge might be capped at 80%.

At 808, the method 800 includes determining a predicted deviating battery demand that differs from the predicted battery demand. The predicted deviating battery demand may be determined based on a contextual signal that indicates that predicted user behavior will likely deviate from the observed user-specific usage patterns. For example, the contextual signal may be received from a scheduling application, an email application, a text message application, a virtual assistant application, or another source from the electronic device or a remote device in communication with the electronic device. At 810, the method 800 includes predictively charging the battery to healthily accommodate the predicted deviating battery demand. In some examples, predictively charging the battery to healthily accommodate the predicted deviating battery demand may include increasing a state of charge from the less-than-full state of charge to a full state of charge responsive to the predicted deviating battery demand predicting the electronic device is likely to be disconnected from a power source. In some such examples, the state of charge of the battery may begin increasing at a time prior to a predicted time when the electronic device will be disconnected from the power source such that the electronic device will be at the full state of charge before the electronic device is predicted to be disconnected from the power source.

In some implementations, the battery may be predictively charged according to the predicted deviating battery demand for a deviation duration that is based on the contextual signal. As one example, the contextual signal may indicate that a user has a meeting scheduled for a set deviation duration (e.g., two hours). As another example, the contextual signal may indicate that a user is traveling for a set deviation duration (e.g., on a flight for five hours). In some such implementations, at 812, the method 800 optionally may include determining whether or not the deviation duration has concluded. If the deviation, duration has concluded, then the method 800 moves to 814. Otherwise, the deviation duration has not concluded, and the method 800 returns to 812 while continuing to predictively charge the battery according to the predicted deviating battery demand. In some implementations, at 814, the method 800 optionally may include returning to predictively charging the battery according to the predicted battery demand at the conclusion of the deviation duration. In some implementations, the method optionally may include checking available contextual signals at the conclusion of the deviation duration to validate a return to predictively charging the battery according to the predicted battery demand.

The herein disclosed solution includes much higher levels of system and software integration, utilizing significantly more use-case and user-context data to improve the performance of the overall BMS system.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data.

Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

In an example, an electronic device comprises a battery, and a battery management system configured to determine a predicted battery demand based on observed usage patterns, predictively charge the battery to healthily accommodate the predicted battery demand, determine a predicted deviating battery demand based on a contextual signal, wherein the predicted deviating battery demand differs from the predicted battery demand, and predictively charge the battery to healthily accommodate the predicted deviating battery demand. In this example and/or other examples, predictively charging the battery to healthily accommodate the predicted battery demand may include limiting the state of charge to a less-than-full state of charge responsive to the predicted battery demand predicting the electronic device is likely to remain connected to a power source. In this example and/or other examples, predictively charging the battery to healthily accommodate the predicted deviating battery demand may include increasing a state of charge from a less-than-full state of charge to a full state of charge responsive to the predicted deviating battery demand predicting the electronic device is likely to be disconnected from a power source. In this example and/or other examples, the battery management system may be configured to predictively charge the battery according to the predicted deviating battery demand for a deviation duration that is based on the contextual signal. In this example and/or other examples, the battery management system may be configured to return to predictively charging the battery according to the predicted battery demand at the conclusion of the deviation duration. In this example and/or other examples, the contextual signal may be received from a scheduling application. In this example and/or other examples, the contextual signal may be received from an email application. In this example and/or other examples, the contextual signal may be received from a text message application. In this example and/or other examples, the contextual signal may be received from a virtual assistant application. In this example and/or other examples, the contextual signal may be received from a remote device via a network. In this example and/or other examples, the battery management system may include a battery management integrated circuit. In this example and/or other examples, the battery management system may include a battery management application. In this example and/or other examples, the battery management system may include an operating system of the electronic device.

In an example, a method for charging a battery of an electronic device comprises determining a predicted battery demand based on observed usage patterns, predictively charging the battery to healthily accommodate the predicted battery demand, determining a predicted deviating battery demand based on a contextual signal, wherein the predicted deviating battery demand differs from the predicted battery demand, and predictively charging the battery to healthily accommodate the predicted deviating battery demand. In this example and/or other examples, predictively charging the battery to healthily accommodate the predicted battery demand may include limiting the state of charge to a less-than-full state of charge responsive to the predicted battery demand predicting the electronic device is likely to remain connected to a power source. In this example and/or other examples, predictively charging the battery to healthily accommodate the predicted deviating battery demand may include increasing a state of charge from a less-than-full state of charge to a full state of charge responsive to the predicted deviating battery demand predicting the electronic device is likely to be disconnected from a power source. In this example and/or other examples, the battery may be predictively charged according to the predicted deviating battery demand for a deviation duration that is based on the contextual signal. In this example and/or other examples, the method may further comprise returning to predictively charging the battery according to the predicted battery demand at the conclusion of the deviation duration. In this example and/or other examples, the contextual signal may be received from at least one of a scheduling application, an email application, a text message application, or a virtual assistant application.

In an example, an electronic device comprises a battery, and a battery management system configured to determine a predicted battery demand based on observed usage patterns, limit a state of charge of the battery to a less-than-full state of charge responsive to the predicted battery demand predicting the electronic device is likely to remain connected to a power source, determine a predicted deviating battery demand based on a contextual signal, and increase the state of charge from the less-than-full state of charge to a full state of charge responsive to the predicted deviating battery demand predicting the electronic device is likely to be disconnected from a power source.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic device, comprising:
   a battery; and
   a battery management system configured to
      determine a predicted battery demand based on observed usage patterns,
      predictively charge the battery to healthily accommodate the predicted battery demand,
      determine a predicted deviating battery demand based on a contextual signal received from at least one of an email application, a text message application, or a virtual assistant application, wherein the predicted deviating battery demand differs from the predicted battery demand, and
      predictively charge the battery to healthily accommodate the predicted deviating battery demand.

2. The electronic device of claim 1, wherein predictively charging the battery to healthily accommodate the predicted battery demand includes limiting the state of charge to a less-than-full state of charge responsive to the predicted battery demand predicting the electronic device is likely to remain connected to a power source.

3. The electronic device of claim 1, wherein predictively charging the battery to healthily accommodate the predicted deviating battery demand includes increasing a state of charge from a less-than-full state of charge to a full state of charge responsive to the predicted deviating battery demand predicting the electronic device is likely to be disconnected from a power source.

4. The electronic device of claim 1, wherein the battery management system is configured to predictively charge the battery according to the predicted deviating battery demand for a deviation duration that is based on the contextual signal.

5. The electronic device of claim 4, wherein the battery management system is configured to return to predictively charging the battery according to the predicted battery demand at the conclusion of the deviation duration.

6. The electronic device of claim 1, wherein the predicted deviating battery demand is determined based on at least one other contextual signal received from a scheduling application.

7. The electronic device of claim 1, wherein the contextual signal is received from the email application.

8. The electronic device of claim 1, wherein the contextual signal is received from the text message application.

9. The electronic device of claim 1, wherein the contextual signal is received from the virtual assistant application.

10. The electronic device of claim 1, wherein the contextual signal is received from a remote device via a network.

11. The electronic device of claim 1, wherein the battery management system includes a battery management integrated circuit.

12. The electronic device of claim 1, wherein the battery management system includes a battery management application.

13. The electronic device of claim 1, wherein the battery management system includes an operating system of the electronic device.

14. A method for charging a battery of an electronic device, the method comprising:
   determining a predicted battery demand based on observed usage patterns;
   predictively charging the battery to healthily accommodate the predicted battery demand;
   determining a predicted deviating battery demand based on a contextual signal received from at least one of an email application, a text message application, or a virtual assistant application, wherein the predicted deviating battery demand differs from the predicted battery demand; and
   predictively charging the battery to healthily accommodate the predicted deviating battery demand.

15. The method of claim 14, wherein predictively charging the battery to healthily accommodate the predicted battery demand includes limiting the state of charge to a less-than-full state of charge responsive to the predicted battery demand predicting the electronic device is likely to remain connected to a power source.

16. The method of claim 14, wherein predictively charging the battery to healthily accommodate the predicted deviating battery demand includes increasing a state of charge from a less-than-full state of charge to a full state of charge responsive to the predicted deviating battery demand predicting the electronic device is likely to be disconnected from a power source.

17. The method of claim 14, wherein the battery is predictively charged according to the predicted deviating battery demand for a deviation duration that is based on the contextual signal.

18. The method of claim 14, further comprising returning to predictively charging the battery according to the predicted battery demand at the conclusion of the deviation duration.

19. The method of claim 14, wherein the predicted deviating battery demand is determined based on at least one other contextual signal received from a scheduling application.

20. An electronic device, comprising:
   a battery; and
   a battery management system configured to
      determine a predicted battery demand based on observed usage patterns,
      limit a state of charge of the battery to a less-than-full state of charge responsive to the predicted battery demand predicting the electronic device is likely to remain connected to a power source,
      determine a predicted deviating battery demand based on a contextual signal received from at least one of an email application, a text message application, or a virtual assistant application, and
      increase the state of charge from the less-than-full state of charge to a full state of charge responsive to the predicted deviating battery demand predicting the electronic device is likely to be disconnected from a power source.

* * * * *